(12) United States Patent
Dreher

(10) Patent No.: US 9,648,996 B2
(45) Date of Patent: May 16, 2017

(54) DRY CLOSET, SEPARATE RECEIVER TOILET

(71) Applicant: Peter Dreher, West Chester, OH (US)

(72) Inventor: Peter Dreher, West Chester, OH (US)

( * ) Notice: Subject to any disclaimer, the term of this patent is extended or adjusted under 35 U.S.C. 154(b) by 360 days.

(21) Appl. No.: 14/552,711

(22) Filed: Nov. 25, 2014

(65) Prior Publication Data

US 2015/0143626 A1    May 28, 2015

Related U.S. Application Data

(60) Provisional application No. 61/908,511, filed on Nov. 25, 2013.

(51) Int. Cl.
    *A47K 11/02*      (2006.01)

(52) U.S. Cl.
    CPC .................. *A47K 11/02* (2013.01)

(58) Field of Classification Search
    CPC .............. A47K 11/03; A47K 11/035
    USPC ............................. 4/459, 462, 463
    See application file for complete search history.

(56) References Cited

U.S. PATENT DOCUMENTS

| | | | | | |
|---|---|---|---|---|---|
| 102,750 | A | * | 5/1870 | Baldwin | B65D 75/32 4/464 |
| 345,053 | A | * | 7/1886 | Heap | B65D 75/32 4/464 |
| 548,543 | A | * | 10/1895 | Hecox | B65D 75/32 4/464 |
| 1,309,742 | A | * | 7/1919 | Moore | A47K 11/02 4/463 |
| 6,393,627 | B1 | * | 5/2002 | Avila | A47K 11/02 4/449 |
| 2009/0000020 | A1 | * | 1/2009 | Ziborov | A47K 11/02 4/479 |

* cited by examiner

Primary Examiner — Huyen Le

(57) ABSTRACT

Floating, Insulated, Waterless Toilet System with Fece-Urine Separation, Slippery Coating, Urine Bag, Dehumidifying Structure, Fecal Disinfection-Deodorization by Microbes, and Urine Disinfection-Deodorization by Hydrogen Peroxide includes a system of components. The Toilet Pedestal is made of a water-proof, structural foam that both floats in water and thermally insulates the Fece Bag. The feces and urine are kept separate by a ridge between the urine bowl and the fece chute. The Toilet Lid forms a temporary seal with the Toilet Platform when the lid is closed. The Toilet Lid is thermally insulated so that it stays warm and dry inside the toilet. The Toilet has a thermally conductive structure that condenses humidity inside the Toilet. The urine and condensation are collected in a Urine Bag. The surfaces of the Toilet are covered by a slippery coating to prevent feces attachment. The feces are disinfected and/or deodorized by special microbes. The urine is disinfected and/or deodorized by Hydrogen Peroxide added to the Urine Bag or at a later step in processing.

16 Claims, 4 Drawing Sheets

DRY CLOSET, SEPARATE RECEIVER TOILET

This patent application takes advantage of and priority from a previously filed USPTO provisional patent application No. 61/908,511 filed on Nov. 25, 2013 by Applicant Dr. Peter Dreher, titled "Floating, Insulated, Waterless Toilet System with Fece-Urine Separation, Slippery Coating, Urine Bag, Dehumidifying Structure, Fecal Disinfection-Deodorization by Microbes, and Urine Disinfection-Deodorization by Hydrogen Peroxide."

FIELD OF THE INVENTION

The present invention is in the field of sanitary equipment, and more particularly, dry closet, separate receiver toilet systems (US class/subclass 4/463). Our definition of 'waterless toilet' means that the toilet operates without the addition of external water i.e. the only water in the toilet is the water latent in the urine and feces and any water from anal washing.

BACKGROUND OF THE INVENTION

Two and a half billion people in the world in 2010 do not have toilets. They defecate and urinate outdoors on the ground and in some cases, they use open latrines. Small children exposed to the ubiquitous feces can get dysentery and die, in fact, 1.3 million do so each year. Mosquitoes, flies, bugs, birds, and rats feed on the open latrines and unburied feces, then spread the worm larvae, viruses, and bacteria to people through bites, stings, and contact with the human food supply. Diseases worse than dysentery are spread this way, too, for example, River Blindness and the deadly Cholera and Typhoid fever.

These poor people cannot afford toilets with plumbing, water, or chemical disinfectants. They have no electricity, piped water, or piped sewage disposal, and very little money. Even the waterless toilet of this invention could be too expensive for some poor people and will require subsidies from aid agencies and charities. Most of these people live in dense, squatter, shanty suburbs of major cities. Though they will urinate on the ground inside or outside their wall-to-wall shanties, they often defecate in a bag and hurl it as far as they can (so called 'flying toilets'). Where it lands is the problem. Though splattering on the roofs and walls of other shanties or on pathways is most common, occasionally it hits a pedestrian.

Many of these people live in monsoonal flood zones and use pit latrines. These latrines are breeding grounds for disease, and they smell bad. When the floods wash into their pit latrines, the fecal germs and worms are spread everywhere. Feces, unfortunately, contain organic and inorganic adhesives; so they stick to everything. Just cleaning the homes after a flood requires gallons of soap and chlorine bleach.

The goals of this dry closet, separate receiver Toilet System invention are several:
1. Float during a flood in a way that the feces and urine do not leak out of the toilet
2. Reduce parasite, bacteria, and virus loading in the solid and liquid wastes quickly
3. Reduce odor from the wastes
4. Prevent feces and urine from adhering to the surfaces of the toilet
5. Limit areas of condensation within the Toilet
6. Be compact and economical for shipping
7. Be low cost

SUMMARY OF THE INVENTION

The invention is based on some assumptions.
1. Raw Human Feces contain bacteria that eat the fecal matter and thereby generate heat. As a result, the decaying feces are 5° C. to 10° C. hotter than the surrounding air.
2. Human feces contain organic and inorganic adhesives that stick to most surfaces.
3. Maggots do not crawl very far across dry surfaces.
4. Pathogens are human disease causing microbes which include worms, worm larvae, parasites, bacteria, viruses, molds, yeast, fungi, etc.
5. If the fece temperature rises above 40° C., some human pathogens die.
6. Bilharzia and Rotavirus are pathogens commonly found in Human urine in the tropics.
7. Hydrogen Peroxide is a powerful disinfectant that kills parasites, bacteria, and viruses.

The invention is a floating, insulated, dry closet, separate receiver toilet system. The feces and urine are kept separate by a ridge between the urine bowl and the fece chute. The toilet has five major components: 1) Toilet Platform, 2) Toilet Pedestal, 3) Toilet Lid, 4) Feces receptacle, and 5) Urine receptacle.

The Toilet Platform is what the user supports himself on during defecation or urination. It has an integral Fece Chute and Urine Bowl with Drain Hole. It is ideally made of molded smooth plastic sheet. The Toilet Pedestal supports the Toilet Platform. Ideally, it is made of foamed material blocks. It holds the Feces Bag and Urine Bag, as well. It floats in water. The Feces Bag catches and holds the feces. It also contains pathogen-killing microbes. It is sealed to the Fece Chute by a rubber band. The Urine Bag catches and holds urine and condensed moisture dripping from the Dehumidifying Structure. The Urine Bag (with attached hose or tube) is sealed to the Urine Bowl Drain, for instance by a hose barb.

The Toilet is sealed from the environment when the lid is closed i.e. when users are not defecating or urinating in it. This seal prevents vermin from entering the toilet system and spreading fecal diseases. This seal prevents odorous gases from escaping the toilet system.

The waterless toilet of this invention has some additional important features.
1. It floats even when filled with feces and urine.
2. It has microbes that kill fecal pathogens and/or reduce odor.
3. It is insulated so that it gets warmer so the microbes kill the pathogens faster.
4. It has an insulated lid to keep the inside of the toilet dry.
5. It has a dehumidifying structure to keep the inside of the toilet dry.
6. It has slippery surfaces so feces and urine slide off and minimize cleaning effort.
7. It has a urine bag that folds for compact and easy shipping.
8. It has a method for reducing urine pathogens and/or odor.

1. Floating Toilet

The first important feature is that the toilet system floats, even when filled with feces and urine. The waterless toilet floats in water and other liquids. The pedestal part of the toilet is made of a water-proof solid foam. This foam could be typically closed-cell polymer foam, like Styrofoam, Polyethylene foam, Polyester Foam, Poly Vinyl Chloride foam, ABS foam, or Polypropylene foam, etc. or any combinations of these foams. These foams are thick enough and strong enough to support a 200 kg person, yet they are light enough to float the entire toilet, fece, and urine weight in water and other liquids.

2. Pathogen-Killing Microbes that also Reduce Odor

The second important feature of our waterless toilet system invention is that the waterless toilet uses special microbes in the toilet to kill pathogenic organisms and/or deodorize fecal matter. In particular, the Feces Bag contains Pathogen-Killing Microbes. These Microbes can be sprayed into the Feces Bag before and/or after defecation. Alternatively, the Microbes can be sprayed onto a 'cover material' that is used to cover the feces after defecation or before as an underlayment. Typical cover materials are sawdust, Bagasse, chopped crop waste, mulched leaves, nut or grain shells (crushed), usually low-cost waste materials with carbon containing compounds.

Some of the Pathogen-Killing Microbes of this invention are yogurt bacteria and beer yeast. Some of the bacteria have tails called flagella that help them swim through feces quickly, eating pathogens along the way. The warmer the feces, the faster the flagellated bacteria swim and the more they eat. At 35° C., our microbes can eat virtually all the pathogenic fecal coliform and *E. Coli* bacteria in a human fece in 48 hours. Fecal coliform bacteria account for 90% of fecal related diseases and deaths. Therefore, our Toilet could eliminate 90% of fecal related diseases, medical expenses, and deaths in the developing world.

However, we think our microbes can kill other human fecal pathogens, in particular, bacteria like Vibrio (Cholera), Typhus (Typhoid Fever), Shigella, Clostridium, Salmonella, etc. Our microbes may also kill protozoa, Cryptosporidium, fungi, and helminthes like Whip worm, Hook worm, Round worm, and Bilharzia, that are also pathogenic to humans.

Our Pathogen-Killing Microbes include, individually and in various combinations, the following organisms:

1. *Lactobacillus Plantarum*
2. *Lactobacillus Casei*
3. *Lactobacillus Fermentum*
4. *Lactobacillus Delbruecki*
5. *Bacillus Subtilis*
6. *Rhodopseudomonas Palustris*
7. *Saccharomyces Cerevisiae*

3. Thermally Insulated Toilet

The third important feature of our waterless toilet system invention is that the Toilet is partially or totally thermally insulated. When fece bacteria eat sugars and proteins in feces, they generate metabolic heat. If that heat is prevented from escaping the Toilet, the temperature of the feces inside will rise. The temperature could rise above 40° C. and kill some pathogens. The present invention prevents the heat from escaping the Toilet by thermally insulating the Toilet, thereby causing the temperature to rise inside.

The preferred insulation material for the Toilet is foamed polymer. It is lightweight, inexpensive, and appropriate to the temperature range. A thermal radiation reflecting material (e.g. gold film) would keep the radiant heat inside the Toilet as well. The Fece Bag inside the Toilet is also insulated from the Toilet by an air gap between the bag and the toilet pedestal wall. The top of the air gap is blocked from mixing with the exterior air, thereby reducing natural convection cooling and keeping the Fece Bag hot. In the preferred embodiment, the Toilet is thermally insulated by a foamed material and/or a thermal radiation shield and/or an air gap. And for the sake of fast, clean, and easy fece transporting, the Toilet is lined on the inside by a removable Feces Bag.

4. Thermally Insulated Toilet Lid

The fourth important feature of our waterless toilet system invention is that the Toilet Lid is partially or totally thermally insulated. This insulation keeps the Lid warm, thereby preventing the warm humid vapors from the warm feces from condensing on the Lid. Therefore, the insulated Lid stays dry as well.

Our previous designs had bare lids (no insulation). Moisture would condense inside the lid. When a user lifted the lid to the vertical position, the condensate would run down the lid, across the seal, and onto the Toilet seat or platform where the user sits. The user then had to wipe up the water before sitting. Furthermore, if a fly had snuck into the Toilet somehow and laid its eggs in the feces, the maggots would crawl out of the feces, up the wet wall of the Fece Chute onto the wet Toilet Platform, across the wet seal, and across the wet lid, tracking brown fecal matter everywhere wet inside the Toilet. This disgusting residue and white maggots, required the user to clean the Toilet with alcohol wipes every time before use.

The thermally insulated Lid stayed dry; the seals stayed dry; and the Toilet Platform stayed dry. The maggots could not climb the dry walls and make their poop tracks. The insulated Toilet Lid solved a major toilet operational problem.

5. Dehumidifying Structure

To make the air inside the Toilet even dryer, the Toilet has a dehumidifying structure for condensation of moisture in the air inside the Toilet. This structure has one side inside the Toilet and the other side outside the Toilet. The structure is made of material with high thermal conductivity, for instance Aluminum, Copper, Steel, Tin, metal alloys, or graphite composites. Colder ambient air outside the Toilet chills the structure, because it is not insulated. The cold structure chills the moisture in the air inside the Toilet, causing the moisture to condense on the cold structure, thereby drying the air inside.

The structure could be a metal plate mounted in a hole in the side of the Urine Bowl. Because the structure can be pointed downwards, the condensate could flow, slide, and/or drip downward, dripping off the tip of the structure flowing into the Urine Bowl Drain and into the cool Urine Bag. The structure could have a special coating that makes the water bead up on its surface, and roll off the structure even faster. One embodiment of the structure is a cone pointing downward toward the Urine Drain mounted in a hole in the Toilet Lid. The hole in the Lid could be directly above the Urine Drain when the Lid is closed.

6. Slippery Surfaces

The sixth important feature of the invention is that one or more surfaces of the toilet are covered with a slippery coating. The Slippery coating covers the surfaces that come in contact with feces and urine. Feces contain organic and inorganic adhesives. Urine can dry and leave a yellow residue. Our Toilet is meant primarily for home use; the homeowner will want to keep it clean and looking nice. If nothing sticks to the inside walls of the Fece Chute and Urine Bowl, it will stay clean automatically. Even if something sticks, it is desirable that it can be wiped off easily, i.e. no chemicals or scraping required for its removal.

Therefore, we use a permanent coating on all or some surfaces of the Toilet System. This coating is slippery for feces and urine. Fece adhesives slide off of it. Urine beads up and rolls off of it. The fece adhesives are actually repelled by the coating. The coating can include the chemicals in Rain-X and coating chemicals developed by Dr. Henryk Malak for American Environmental Systems and others, including those that use Plasmon-enhanced nano-particles, including compounds of Titanium.

7. Urine Bag

The seventh important feature of the invention is that the Toilet has a Urine Collection Bag. It is flexible and collapsible and can be stored in a compact space. It is impermeable to urine and the worms and germs in urine. A particular embodiment of the Urine Collection Bag is low cost, and made of tough plastic sheeting. It could be thermally welded at the top and bottom end. The top end weld could have a hole for a tube or hose. The hole could be sealed to the tube by glue, thermal welding, tight mechanical fastener, etc. The other end of the tube could be temporarily attached to the Urine Drain on the Toilet.

The Urine Collection Bag of this invention could be used for all toilets that separate urine and feces, so-called urine diverting toilets. One embodiment of the Urine Collection Bag has a small opening for filling and/or discharging such that complete gravity filling or discharging of the bag takes more than 20 seconds. This bag is designed for a single purpose—to collect urine from toilets. Poor people in underdeveloped countries often cannibalize equipment for other purposes. For instance, if we supplied a standard 20 liter bottle for urine collection, clients might use it to transport well water, or goat's milk, or cooking oil in the morning and then use it for urine collection on our toilet the rest of the day. This misuse defeats our public health mission. Therefore, our Urine Bag has a small opening of a long thin hose or tube as a fill pipe or port that takes a long time to fill the bag and a long time to empty the bag (more than 20 seconds). This slow fill and discharge will prevent all but the most dire of dual uses.

The Urine Collection Bag, has handles on one or more sides of the urine collection bag. In one embodiment, the plastic sheeting could extend above the top seal and below the bottom seal. In each of these extended sheeting sections is a hole for hand or hook grabbing. A urine collection agent can grab the top hand hole to lift the Urine Bag out of the Toilet while keeping the fill hole or fill tube upward, thereby preventing spills. When the Urine Bag is to be emptied at the urine processing facility, the bottom hand hole is lifted and hung on a hook or peg, etc., inverting the Urine Bag and allowing the urine inside to drain out of the fill hole or tube by gravity.

8. Urine Disinfection and Deodorization

The eighth important feature of the invention is a method that uses hydrogen peroxide to kill pathogenic organisms in urine and/or to deodorize urine. We add a sufficient amount of Hydrogen Peroxide to oxidize and 'burn-up' the pathogens in urine, mainly Bilharzia Schistosoma and Rotavirus. We also add sufficient amounts of Hydrogen Peroxide to convert the urea and ammonia in urine to nitrates and other non-volatile or non-odorous compounds. The main smelly part of urine is the ammonia. Hydrogen Peroxide converts ammonia to non-smelly nitrate compounds. The addition of Hydrogen Peroxide to the urine can be done while the urine is still in the Toilet, i.e. in the urine collection bag, or after the urine is emptied from the urine collection bag.

DETAILED DESCRIPTION OF THE PREFERRED EMBODIMENT OF THE INVENTION

Figure 1:
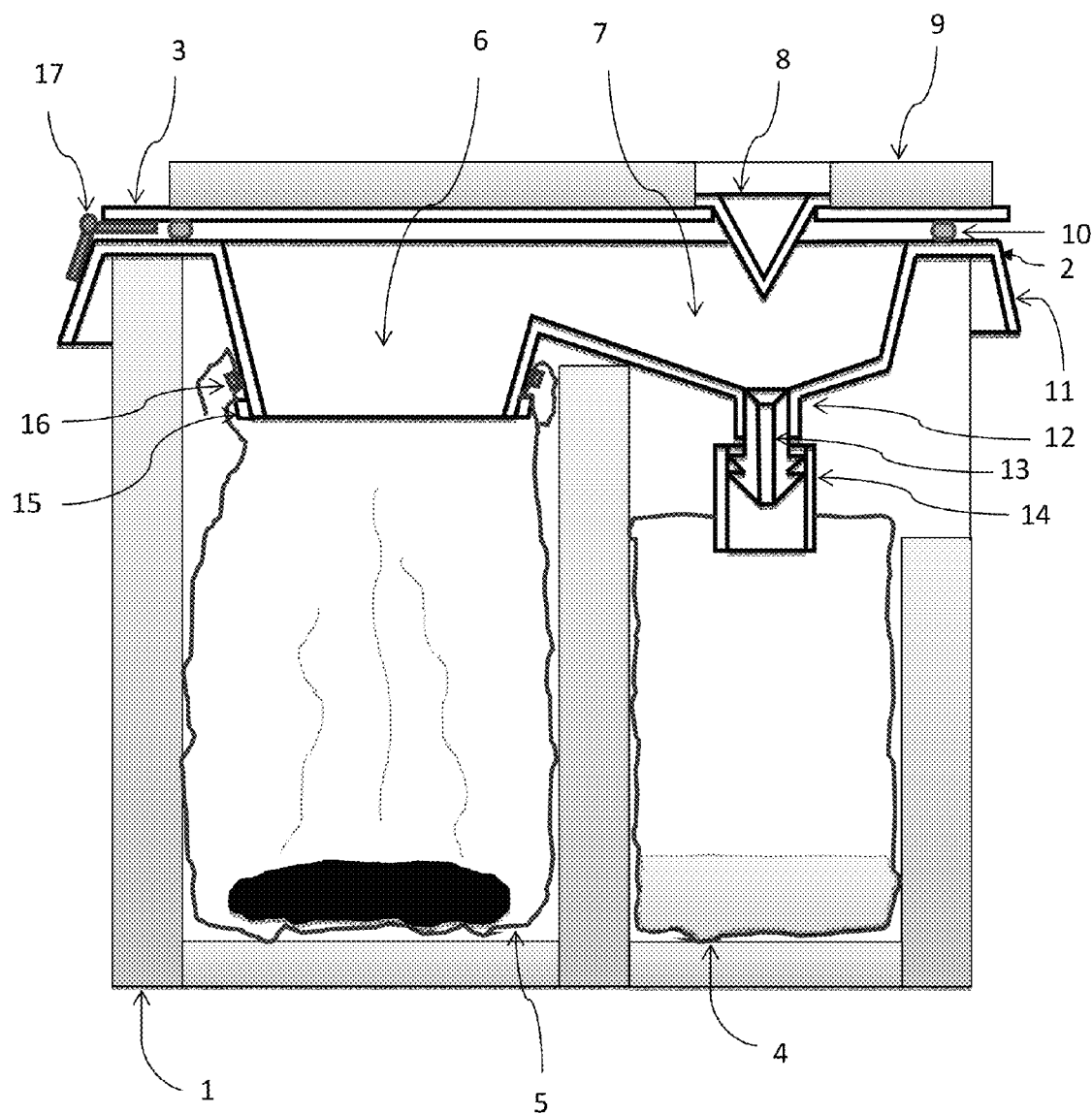
FIG. 1 is a cross sectional side view of the floating waterless toilet system according to the present invention with the seat lid in the closed position.

The Floating, Insulated, Waterless Toilet System with Fece-Urine Separation, Slippery Coating, Urine Bag, Dehumidifying Structure, Fecal Disinfection-Deodorization by Microbes, and Urine Disinfection-Deodorization by Hydrogen Peroxide can be described as a system of components. The system has five main components as shown in FIG. 1. They are: Toilet Pedestal 1, Toilet Platform 2, Toilet Lid 3, Urine Bag 4, and Fece Bag 5.

The Toilet Pedestal 1 is made of structural foam. It can be cast as a single foam piece or fastened or glued together as several foam panels.

The Toilet Platform 2 is made of an impermeable structural material, preferably plastic or fiber reinforced plastic. It has a Structural Vertical Flange 11 around the outside. The Toilet Platform 2 is otherwise a flat horizontal surface with a Fece Chute 6 and a Urine Bowl 7 molded or formed into it.

When feces fall down the Fece Chute 6, they land in the Fece Bag 5. Fece Bag 5 is held onto Fece Chute 6 by a Rubber Band 16. A Structural Protrusion 15 is attached to or molded on the outside of Fece Chute 6. Structural Protrusion 15 prevents Rubber Band 16 from sliding down and off Fece Chute 6.

When urine lands in the Urine Bowl 7, it flows down to the Urine Bowl Drain 12 and into the Urine Hose Barb 13. From there, the urine flows down into the Urine Hose 14 and then down into Urine Bag 4.

The Toilet Lid 3 is attached to the Toilet Platform 2 by Hinges 17. The Toilet Lid 3 can rotate upward about the pivot in Hinge 17, to an open position. Toilet Lid 3 is temporarily sealed to Toilet Platform 2 by Gasket 10, to prevent ingress and egress of odors and vermin. Lid Thermal Insulation 9 is attached to Toilet Lid 3 to keep Toilet Lid 3 warm and dry.

The Dehumidifying Structure 8 embodiment is shown as a cone attached to Toilet Lid 3. Dehumidifying Structure 8 is shown to be directly above Urine Drain 12 when Toilet Lid 3 in the closed position. Dehumidifying Structure 8 is made of a thermally conductive material. Dehumidifying Structure 8 remains relatively cold like the ambient air above it. Therefore, Dehumidifying Structure 8 condenses moisture out of the relatively warm and steamy air inside the Toilet. The moisture droplets that form on Dehumidifying Structure 8 run down the structure and fall off the tip, falling directly into Urine Drain 12.

Figure 2:
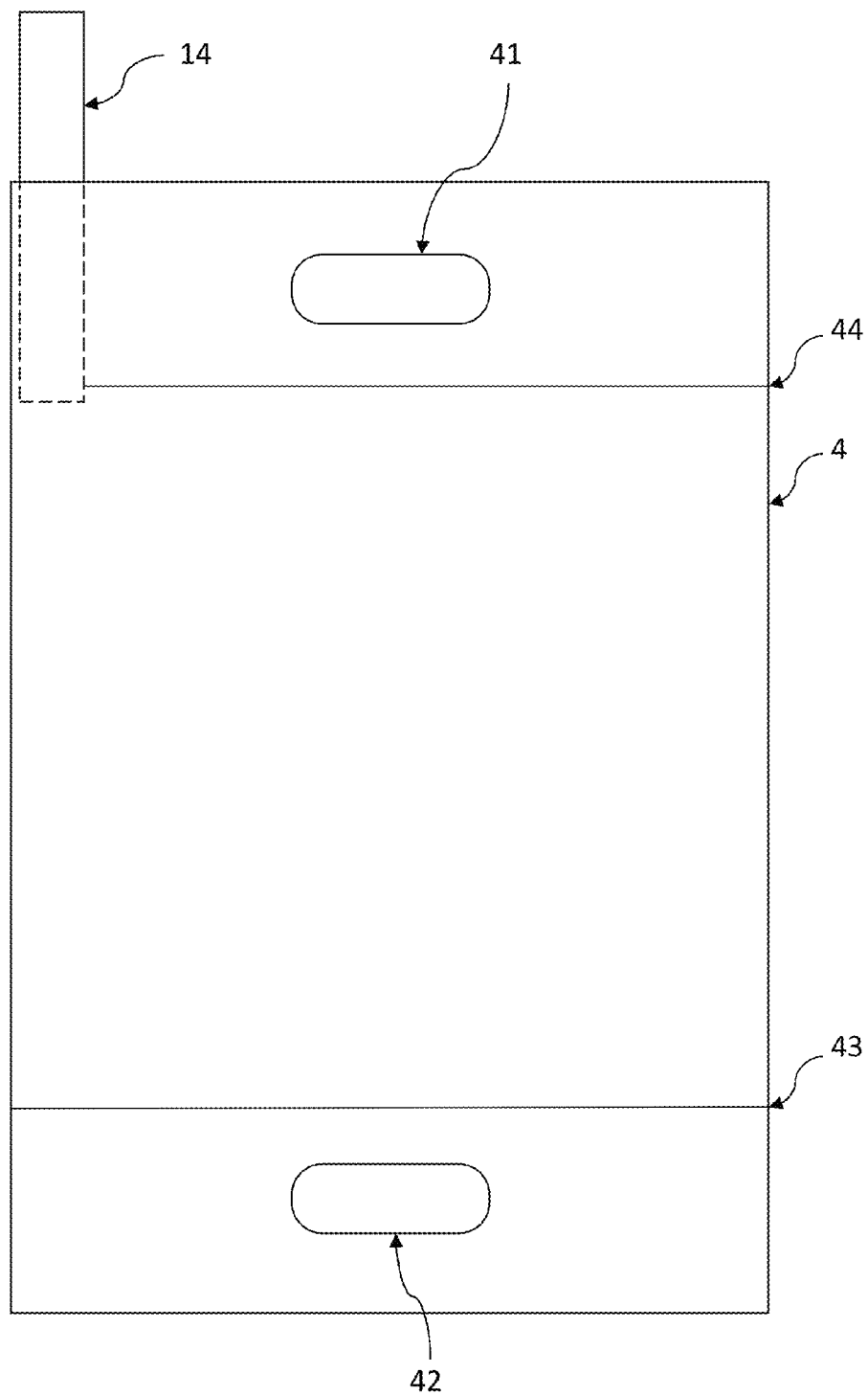
FIG. 2 is a front view of the Urine Bag according to the present invention.

FIG. 2 shows the front face of the Urine Bag 4 and associated Urine Hose 14. The Urine Bag 4 has an Upper Hand Hold 41 on the top side of Urine Bag 4 and a Lower Hand Hold 42 on the lower side of Urine Bag 4. While the Upper Hand Hold 41 is used for filling and carrying Urine Bag 4, Lower Hand Hold 42 is for emptying Urine Bag 4. The bottom side of Urine Bag 4 has a Thermal Seal 43 to prevent liquids from leaking. The top side of Urine Bag 4 has a Thermal Seal 44 that seals the top of Urine Bag 4. Urine Hose 14 is sealed to Urine Bag 4 by glue, thermal bonding, or a mechanical clamp.

Figure 3:
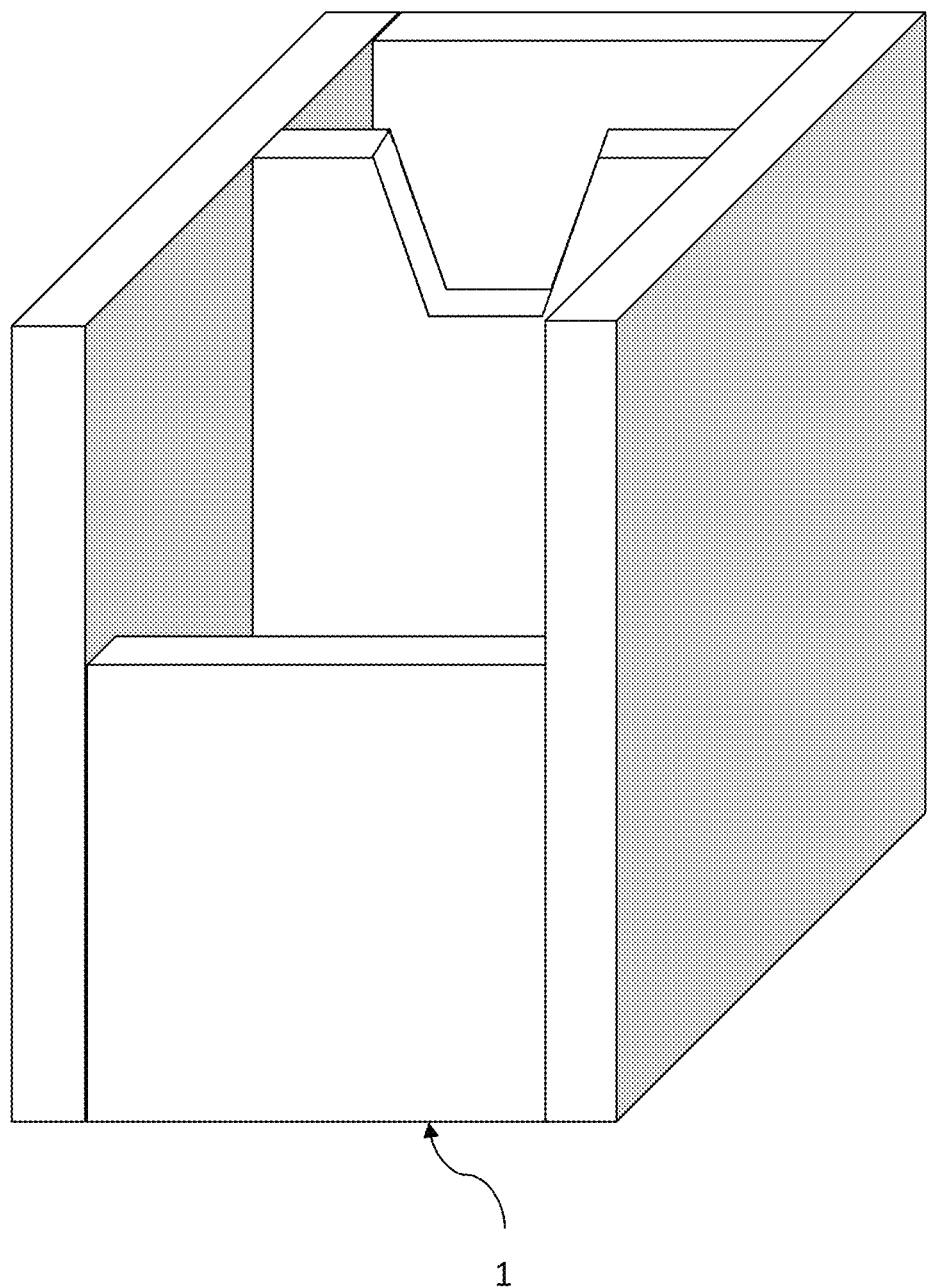
FIG. 3 is a front isometric view of the Toilet Pedestal according to the present invention.
Figure 4:
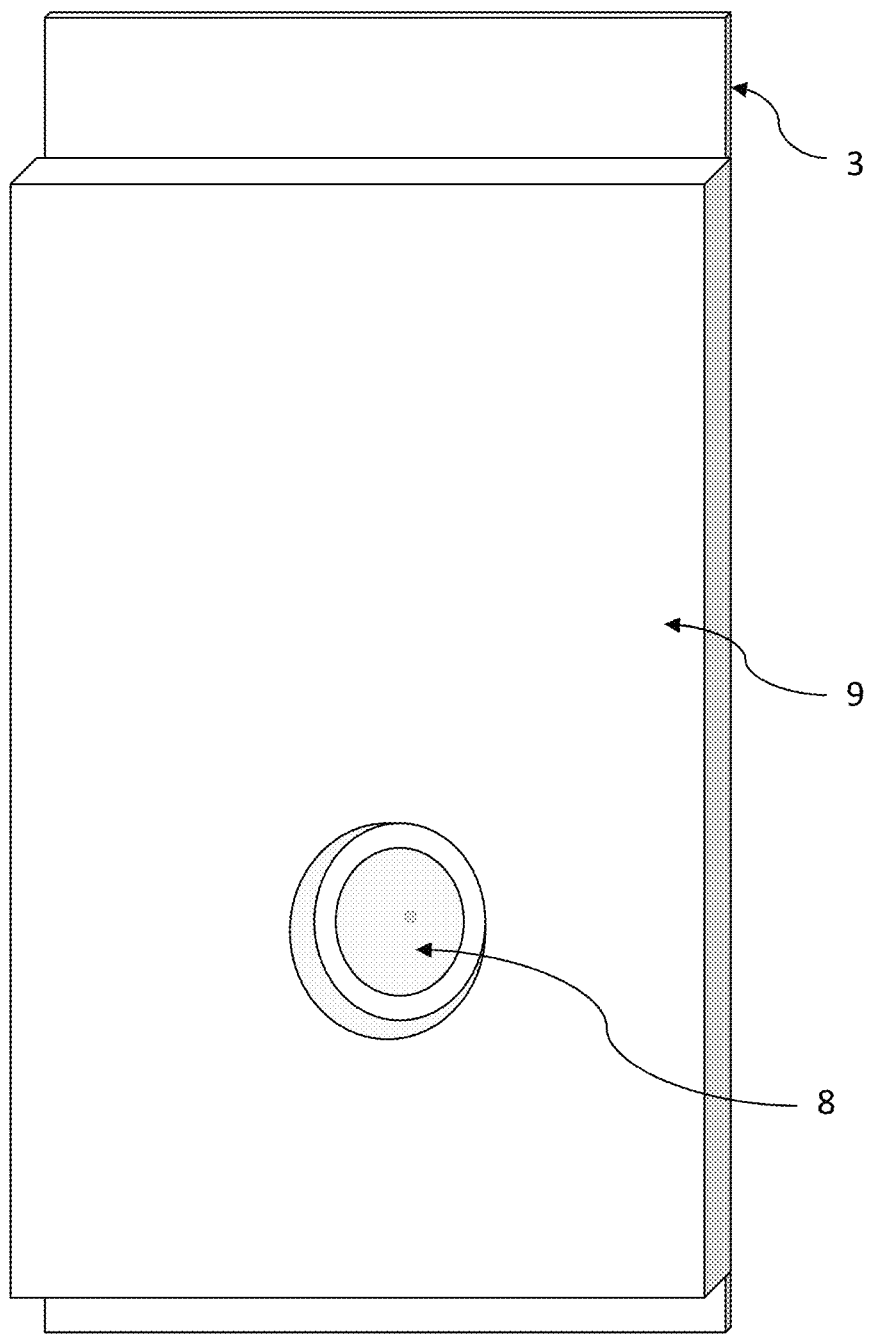
FIG. 4 is a top isometric view of the Toilet Lid according to the present invention.

FIG. 3 shows a front isometric view of the Toilet Pedestal 1. FIG. 4 shows a top isometric view of Toilet Lid 3 with Dehumidifying Structure 8 and Lid Thermal Insulation 9, but without the Hinges 17.

While only one embodiment of the present invention has been shown and described, it will be understood that various modifications and changes could be made thereunto without departing from the spirit and scope of the invention disclosed.

The invention claimed is:

1. A dry closet, separate receiver toilet, comprising:
  a) A reception means for collecting feces and urine, the reception means including a urine receptacle and a feces receptacle, the reception means including an opening therein;
  b) A toilet platform including an opening, the platform disposed on top of the reception means such that the toilet platform opening and reception means opening are coextensive, the toilet platform including a front part and rear part, and the urine and feces receptacles are disposed under the toilet platform opening such that the urine receptacle debouches into the front of the part of the toilet platform opening and the feces receptacle debouches in to the rear part of the toilet platform opening;
  c) A means for floating the toilet on water.

2. Said toilet of claim 1, wherein the toilet is thermally insulated by a foamed material.

3. Said toilet of claim 1, wherein surfaces of the toilet are covered with a slippery coating.

4. Said toilet of claim 1, wherein the toilet platform opening has a cover means.

5. Said cover means of claim 4, wherein the cover means has a thermally conducting structure for condensing of moisture in the air inside the toilet.

6. Said feces receptacle of claim 1, wherein pathogen-killing microbes placed in the feces receptacle kill pathogenic organisms and/or deodorize fecal matter.

7. Said toilet of claim 1, wherein the urine receptacle has a urine collection bag.

8. A dry closet, separate receiver toilet, comprising:
  a) A reception means for collecting feces and urine, the reception means including a urine receptacle and a feces receptacle, the reception means including an opening therein;
  b) A toilet platform including an opening, the platform disposed on top of the reception means such that the toilet platform opening and reception means opening are coextensive, the toilet platform including a front part and rear part, and the urine and feces receptacles are disposed under the toilet platform opening such that the urine receptacle debouches into the front of the part of the toilet platform opening and the feces receptacle debouches in to the rear part of the toilet platform opening;
  c) Pathogen-killing microbes placed in the feces receptacle
  wherein the microbes kill pathogenic organisms and/or deodorize fecal matter.

9. Said toilet of claim 8, wherein the toilet is thermally insulated by a foamed material.

10. Said toilet of claim 8, wherein the toilet has surfaces covered with a slippery coating.

11. Said toilet of claim 8, wherein the toilet has a thermally conducting structure for condensing of moisture in the air inside the Toilet.

12. Said urine receptacle of claim 8, wherein the urine receptacle has a urine collection bag.

13. The urine collection bag of claim 12, wherein the bag has a small filling or discharging opening such that complete gravity filling or discharging of the bag takes more than 5 seconds.

14. Said urine collection bag of claim 12, has handles on one or more sides of the urine collection bag.

15. Said urine receptacle of claim 8, wherein hydrogen peroxide is put in the urine receptacle to kill pathogenic organisms in urine and/or to deodorize urine.

16. A dry closet, separate receiver toilet, comprising:
  a) A reception means for collecting feces and urine, the reception means including a urine receptacle and a feces receptacle, the reception means including an opening therein;
  b) A toilet platform including an opening, the platform disposed on top of the reception means such that the toilet platform opening and reception means opening are coextensive, the toilet platform including a front part and rear part, and the urine and feces receptacles are disposed under the toilet platform opening such that the urine receptacle debouches into the front of the part of the toilet platform opening and the feces receptacle debouches in to the rear part of the toilet platform opening;
  c) Foamed material for thermal insulation.

* * * * *